US 11,875,921 B2

(12) United States Patent
Lyon et al.

(10) Patent No.: US 11,875,921 B2
(45) Date of Patent: Jan. 16, 2024

(54) LIGHTWEIGHT CARBON NANOTUBE CABLE COMPRISING A PAIR OF PLATED TWISTED WIRES

(71) Applicant: Northrop Grumman Systems Corporation, Falls Church, VA (US)

(72) Inventors: Bradley J. Lyon, Hoffman Estates, IL (US); Nana Kim, Redondo Beach, CA (US); Hsiao-Hu Peng, Rancho Palos Verdes, CA (US); John A. Starkovich, Redondo Beach, CA (US); Edward M. Silverman, Encino, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 310 days.

(21) Appl. No.: 16/140,811

(22) Filed: Sep. 25, 2018

(65) Prior Publication Data

US 2019/0122788 A1 Apr. 25, 2019

Related U.S. Application Data

(62) Division of application No. 15/791,730, filed on Oct. 24, 2017, now Pat. No. 10,128,022.

(51) Int. Cl.
*H01B 13/016* (2006.01)
*H01B 13/06* (2006.01)
(Continued)

(52) U.S. Cl.
CPC ............ *H01B 7/18* (2013.01); *C01B 32/168* (2017.08); *C25D 3/38* (2013.01); *C25D 5/54* (2013.01);
(Continued)

(58) Field of Classification Search
CPC .......... D04C 1/00; C23C 28/00; H01B 13/00; H01B 13/222; H01B 13/016; H01B 13/06; H01B 13/2606; C25D 5/54; C25D 7/0607
(Continued)

(56) References Cited

U.S. PATENT DOCUMENTS

2006/0049058 A1* 3/2006 van Wijngaarden .... C25D 3/38
205/291
2009/0194313 A1 8/2009 Jiang et al.
(Continued)

FOREIGN PATENT DOCUMENTS

CN 103377764 A * 10/2013 ............. H01B 11/00
CN 107068254 A 8/2017
(Continued)

OTHER PUBLICATIONS

Ramesh et al., "Dissolution of Pristine Single Walled Carbon Nanotubes in Superacids by Direct Protonation," The Journal of Physical Chemistry B. (Jul. 1, 2004), vol. 108, pp. 8794-8798. (Year: 2004).*
(Continued)

*Primary Examiner* — Edna Wong
(74) *Attorney, Agent, or Firm* — KLINTWORTH & ROZENBLAT IP LLP

(57) ABSTRACT

A carbon nanotube (CNT) cable includes: a pair of plated twisted wires, each wire comprising one or more sub-cores, at least one sub-core comprising CNT yarn; a dielectric surrounding the plated twisted wires; and an electrical layer surrounding the dielectric, the electrical layer configured to shield the CNT cable. A method for making a CNT cable includes: controlling a deposition rate, depositing plating so as to surround a pair of wires, each wire comprising one or more sub-cores, at least one sub-core comprising CNT yarn;
(Continued)

twisting the plated wires together; and surrounding the plated twisted wires with an electrical layer configured to shield the plated twisted wires, thereby creating the CNT cable.

7 Claims, 10 Drawing Sheets

(51) Int. Cl.
| | |
|---|---|
| C23C 28/00 | (2006.01) |
| C25D 5/54 | (2006.01) |
| H01B 7/18 | (2006.01) |
| C25D 3/38 | (2006.01) |
| C25D 7/06 | (2006.01) |
| C01B 32/168 | (2017.01) |
| H01B 7/02 | (2006.01) |
| H01B 13/22 | (2006.01) |
| H01B 13/02 | (2006.01) |
| H01B 1/04 | (2006.01) |
| H01B 11/20 | (2006.01) |
| H01B 11/00 | (2006.01) |

(52) U.S. Cl.
CPC ............ *C25D 7/0607* (2013.01); *H01B 1/04* (2013.01); *H01B 7/0216* (2013.01); *H01B 11/20* (2013.01); *H01B 13/0207* (2013.01); *H01B 13/06* (2013.01); *H01B 13/222* (2013.01); *H01B 11/002* (2013.01)

(58) Field of Classification Search
USPC ....... 87/1, 3; 427/177, 299, 322, 404, 419.2; 205/159, 191, 210, 194
See application file for complete search history.

(56) References Cited

U.S. PATENT DOCUMENTS

| | | | | |
|---|---|---|---|---|
| 2009/0255706 | A1* | 10/2009 | Jiang | H01B 11/1808 174/102 R |
| 2012/0118552 | A1* | 5/2012 | White | H01B 7/42 165/185 |
| 2012/0144984 | A1* | 6/2012 | Head, III | D04C 3/18 87/8 |
| 2013/0183439 | A1* | 7/2013 | Starkovich | H01B 13/0036 977/932 |
| 2013/0299211 | A1* | 11/2013 | Pope | H01B 11/1813 174/113 R |
| 2014/0102755 | A1* | 4/2014 | Adriaenssens | H01B 11/02 174/113 R |
| 2015/0107890 | A1* | 4/2015 | Mann | H01B 1/04 174/350 |
| 2015/0313044 | A1* | 10/2015 | Wang | D04C 1/06 2/455 |
| 2016/0133355 | A1* | 5/2016 | Glew | H01B 1/22 248/49 |
| 2016/0145784 | A1* | 5/2016 | Schauer | D04H 1/72 427/113 |
| 2016/0148725 | A1* | 5/2016 | Flory | H01B 1/02 174/107 |
| 2016/0222536 | A1* | 8/2016 | Schauer | C25F 1/00 |
| 2017/0162300 | A1* | 6/2017 | Hasan | H01B 9/023 |
| 2017/0274390 | A1* | 9/2017 | Manyapu | B08B 17/02 |
| 2018/0247724 | A1* | 8/2018 | Richmond | H01B 1/026 |
| 2018/0254127 | A1* | 9/2018 | Dorner | H01B 11/1847 |
| 2018/0315521 | A1* | 11/2018 | Kukowski | H01B 11/1808 |

FOREIGN PATENT DOCUMENTS

| | | | | | |
|---|---|---|---|---|---|
| EP | | 3205752 A1 | * | 8/2017 | ............ C25D 17/00 |
| EP | | 3364422 A1 | * | 8/2018 | ............ H01B 1/02 |
| JP | | 2010114019 | | 5/2010 | |
| JP | | 2012533158 | | 12/2020 | |
| TW | | 200939252 A | * | 9/2009 | ............ H01B 11/06 |
| WO | WO-2011005964 A1 | | * | 1/2011 | ............ H01B 1/026 |

OTHER PUBLICATIONS

Jarosz et al., "Carbon Nanotube Wires and Cables: Near-Term Applications and Future Perspectives," Nanoscale (2011), vol. 3, No. 11, pp. 4542-4553. (Year: 2011).*

Lekawa-Raus et al., "Electrical Properties of Carbon Nanotube Based Fibers and Their Future Use in Electrical Wiring," Advanced Functional Materials (Jun. 2014), vol. 24, No. 24, pp. 3661-3682. (Year: 2014).*

Hannula et al., "Carbon Nanotube-Copper Composites by Electrodeposition on Carbon Nanotube Fibers," Carbon (Oct. 1, 2016), vol. 107, pp. 281-287. (Year: 2016).*

Notification Concerning Transmittal of International Preliminary Report on Patentability, issued in related Application No. PCT/US2018/052604, dated May 7, 2020, 9 pages.

Database WPI Week 201772 Aug. 18, 2017 (Aug. 18, 2017)Thomson Scientific, London, GB; AN 2017-580002 & CN 107 068 254 A (Anhui Aics Technology Group Co Ltd) Aug. 18, 2017 (Aug. 18, 2017) (Abstract Only), 1 page.

Notice of Reasons for Rejection in related Japanese Application No. 2020-521595, dated Aug. 29, 2022, 6 pages.

Decision of Refusal in related Japanese Application No. 2020-521595, dated Dec. 13, 2022, 7 pages.

* cited by examiner

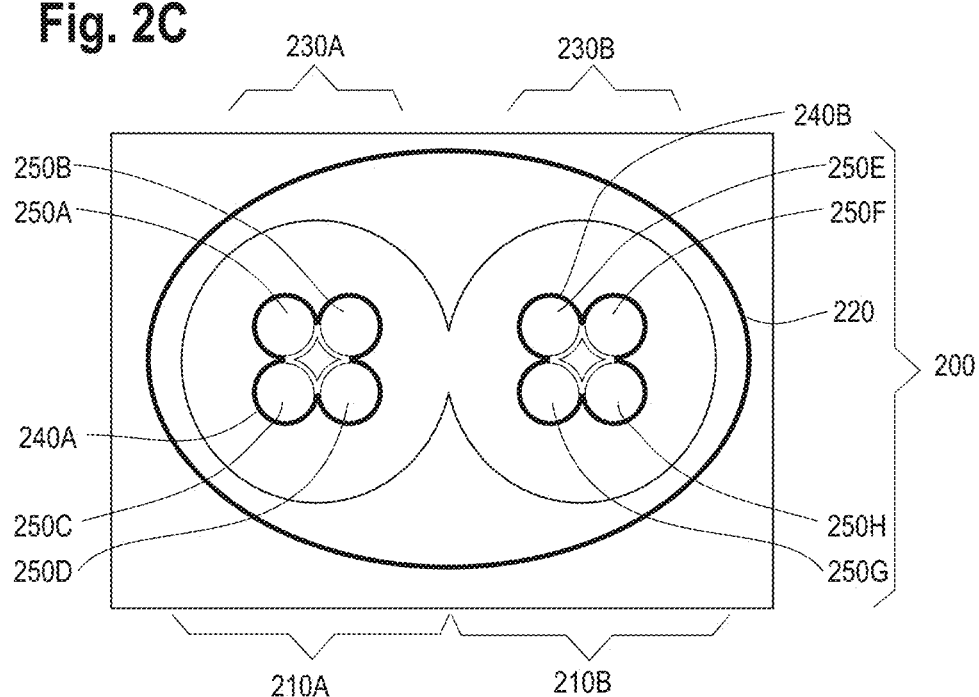
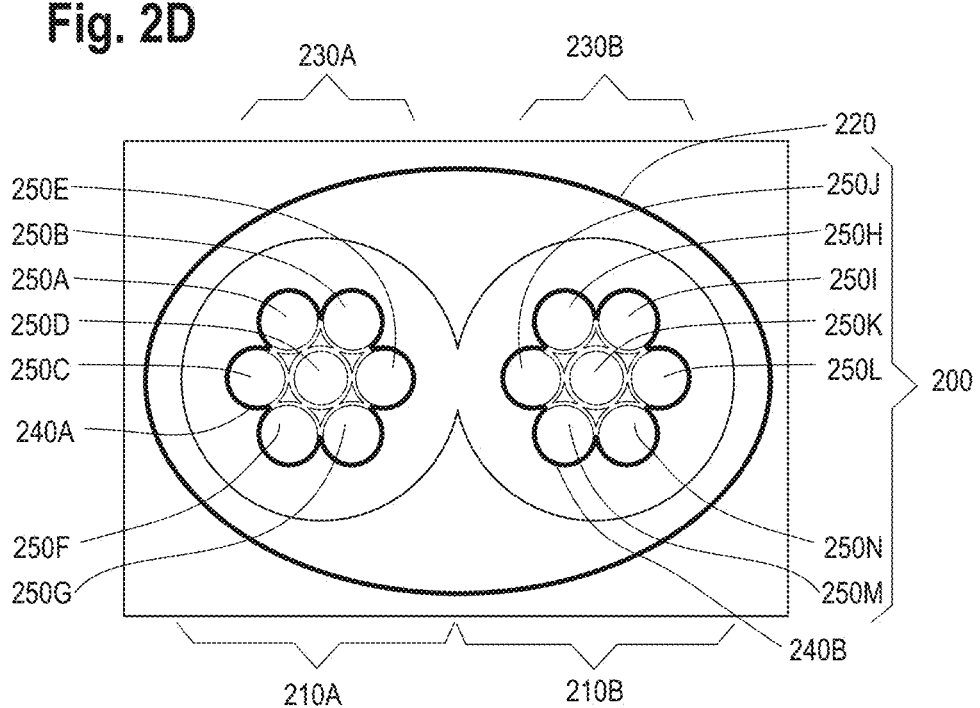

28 AWG, 1.5 tex, No pretreatment
Bare CNT Wire

28 AWG, 1.5 tex, No pretreatment
Cu Plated

28 AWG, 10 tex, CSY pretreatment
Bare CNT Wire

28 AWG, 10 tex, CSY pretreatment
Cu Plated

Small-Scale Surface Roughness
Low Current
24 AWG
Avg Grain Size=1.8 μm

Small-Scale Surface Roughness
High Current
24 AWG
Avg Grain Size=1.8 μm

Large-Scale Surface Defects
Low Current
24 AWG
Avg Grain Size=1.8 μm

Large-Scale Surface Defects
High Current
24 AWG
Avg Grain Size=1.8 μm

Small-Scale Surface Roughness
Low Current

28 AWG

Avg Grain
Size=7.2 µm

Small-Scale Surface Roughness
High Current

28 AWG

Avg Grain
Size=7.2 µm

Large-Scale Surface Defects
Low Current

28 AWG

Avg Grain
Size=7.2 µm

Large-Scale Surface Defects
High Current

28 AWG

Avg Grain
Size=7.2 µm

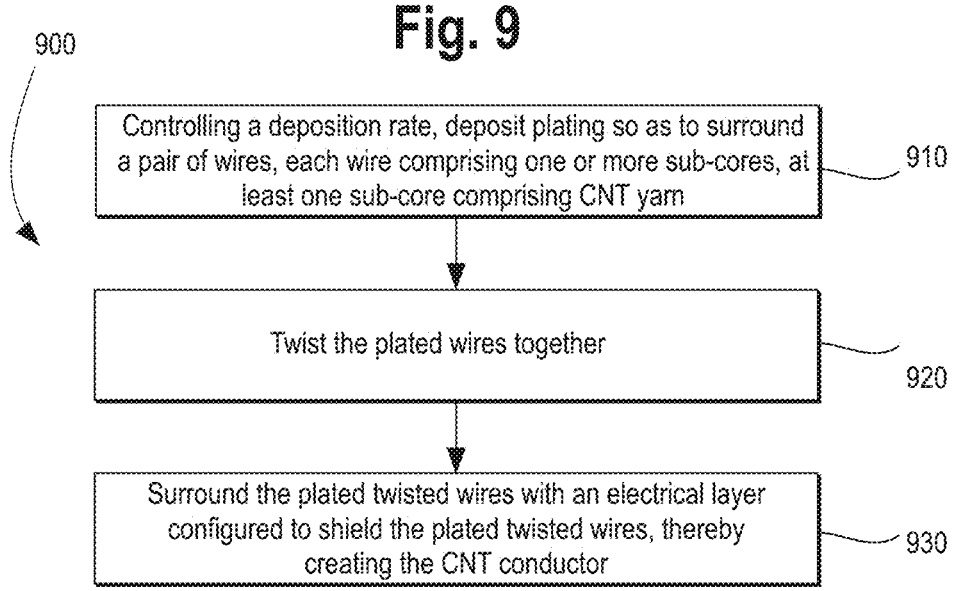
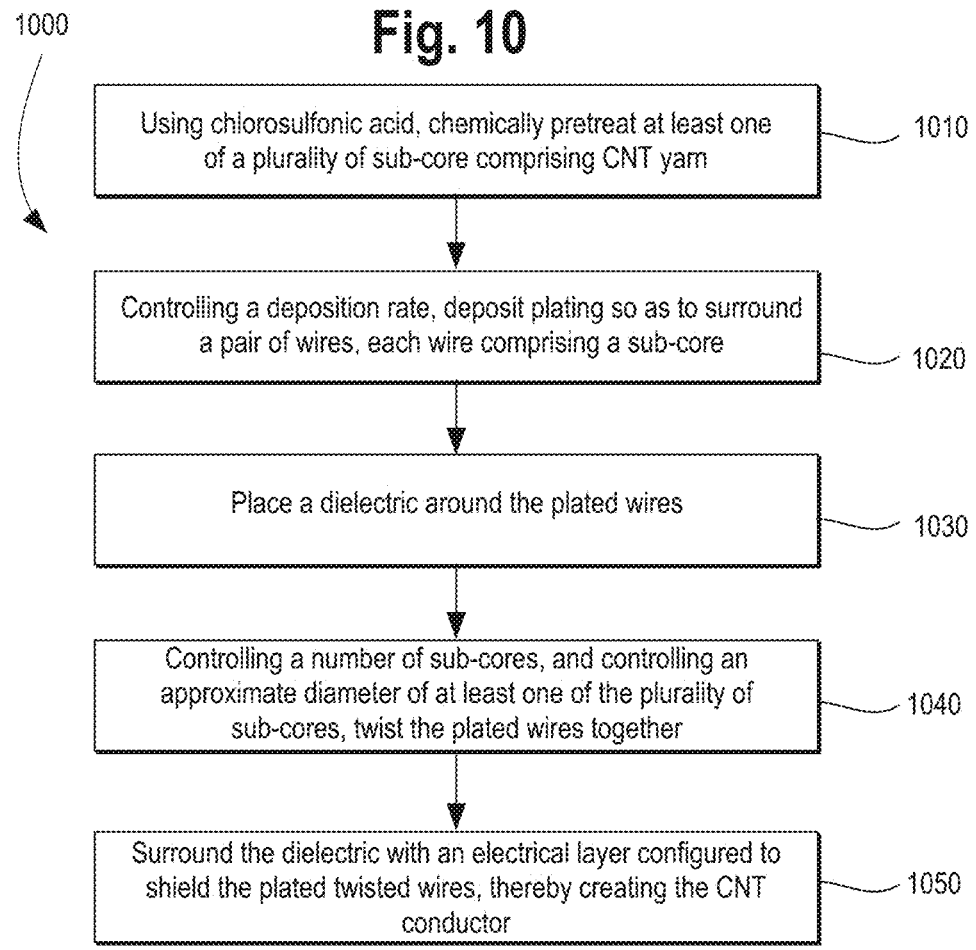

LIGHTWEIGHT CARBON NANOTUBE CABLE COMPRISING A PAIR OF PLATED TWISTED WIRES

STATEMENT OF GOVERNMENT RIGHTS

This invention was made with Government support. The Government has certain rights in this invention.

SUMMARY

A carbon nanotube (CNT) cable includes: a pair of plated twisted wires, each wire comprising one or more sub-cores, at least one sub-core comprising CNT yarn; a dielectric surrounding the plated twisted wires; and an electrical layer surrounding the dielectric, the electrical layer configured to shield the CNT cable.

A method for making a carbon nanotube (CNT) cable includes: controlling a deposition rate, depositing plating so as to surround a pair of wires, each wire comprising one or more sub-cores, at least one sub-core comprising CNT yarn; twisting the plated wires together; and surrounding the plated twisted wires with an electrical layer configured to shield the plated twisted wires, thereby creating the CNT cable.

A method for making a carbon nanotube (CNT) cable includes: using chlorosulfonic acid, chemically pretreating at least one of a plurality of sub-cores comprising CNT yarn; controlling a deposition rate, depositing plating so as to surround each of a pair of wires, each wire comprising a sub-core; placing a dielectric around the plated wires; controlling a number of sub-cores, and controlling an approximate diameter of at least one of the plurality of sub-cores, twisting the plated wires together; and surrounding the dielectric with an electrical layer configured to shield the plated twisted wires, thereby creating the CNT cable.

DESCRIPTION OF THE DRAWINGS

The accompanying drawings provide visual representations which will be used to more fully describe various representative embodiments and can be used by those skilled in the art to better understand the representative embodiments disclosed herein and their advantages. In these drawings, like reference numerals identify corresponding elements.

FIGS. 2A-2D are a set of four schematic drawings showing components of a CNT yarn cable respectively comprising three, one, four, and seven sub-cores in each core.

FIG. 9 is a flowchart of a method for making a CNT yarn cable.

FIG. 10 is a flowchart of a method for making a CNT yarn cable.

DETAILED DESCRIPTION

Figure 1:
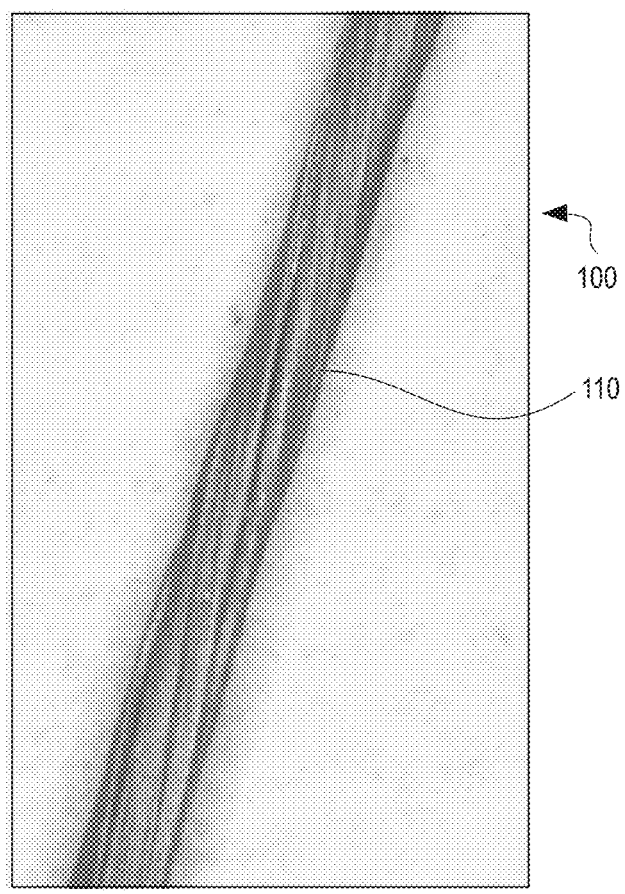
FIG. 1 is a photograph of a plated twisted wire comprising one or more sub-cores, at least one sub-core comprising CNT yarn.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

According to embodiments of the invention, a CNT yarn cable is provided. For example, a CNT cable is provided. For example, a strong CNT cable is provided. For example, a lightweight CNT cable is provided. For example, a strong, lightweight CNT cable is provided. For example, a resilient CNT cable is provided.

For example, a cable is provided having low radio frequency (RF) insertion loss. For example, a cable is provided having an RF insertion loss less than or equal to approximately 2.0 decibels per foot at a frequency of approximately 1 Gigahertz. For example, a cable is provided having an RF insertion loss less than or equal to approximately 4.0 decibels per foot at a frequency of approximately 4 Gigahertz. For example, a cable is provided having an insertion loss equivalent to the insertion loss of a solid copper wire. For example, a cable is provided having high electrical conductivity.

FIG. 1 is a photograph 100 of a plated twisted wire 110 comprising one or more sub-cores, at least one sub-core comprising CNT yarn.

Figure 2A:
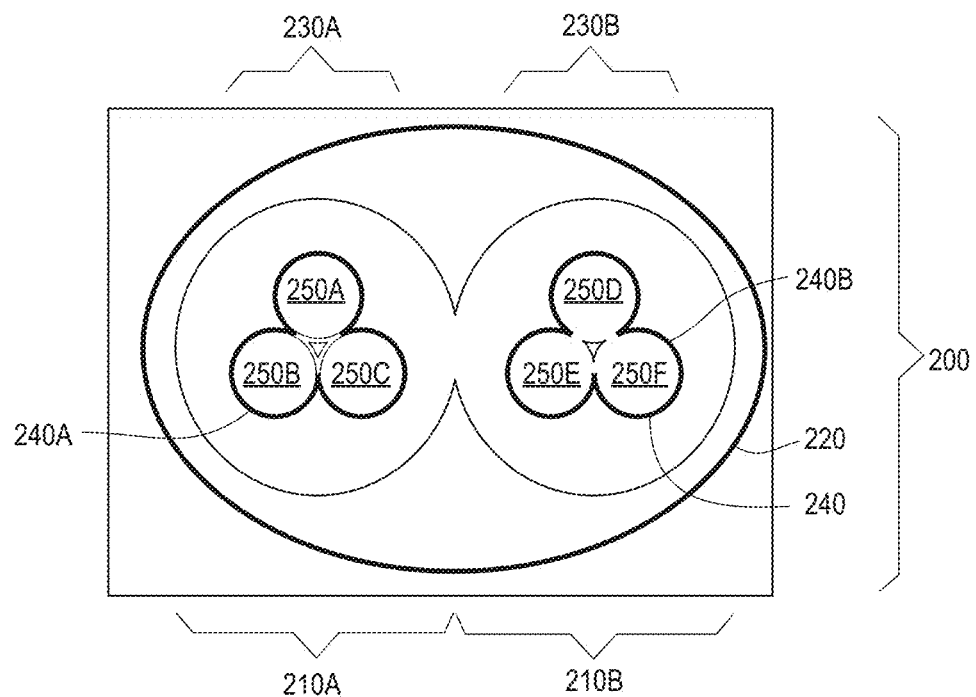

FIGS. 2A-2D are a set of four schematic drawings showing components of a CNT cable 200. In FIG. 2A, the CNT cable 200 comprises a 28 American Wire Gauge (AWG) high speed CNT cable 200. As depicted, the CNT cable comprises a pair of twisted wires, a first twisted wire 210A and a second twisted wire 210B.

The twisted wires 210A, 210B are shielded by the shield 220 that forms an electrical layer 220 of the CNT cable 200. For example, the electrical layer 220 comprises an external surface 220 of the CNT cable 200. For example, the electrical layer 200 is surrounded by a physical layer (not shown). For example, the electrical layer 200 is surrounded by a braid (not shown), the braid configured to protect the electrical layer 200 from abrasion.

At least one of the twisted, shielded wires 210A, 210B comprises a core. For example, the first twisted wire 210A comprises a first core 230A. For example, the second twisted wire 210B comprises a second core 230B. As depicted, the first twisted wire 210A comprises a first core 230A, and the second twisted wire 210B comprises a second core 230B. For example, at least one of the twisted shielded wires 210A, 210B, has a desired number of sub-cores.

The first core 230A is surrounded by first plating 240A. The second core 230B is surrounded by second plating 240B. For example, one or more of the first plating 240A and the second plating 240B comprises copper plating. For example, one or more of the first copper plating 240A and the second copper plating 240B comprises electroplated copper plating. For example, one or more of the first plating 240A and the second plating 240B comprises silver plating. For example, one or more of the first plating 240A and the second plating 240B comprises gold plating. As depicted, the first core 230A is surrounded by a first copper plating 240A. As depicted, the second core 230B is surrounded by a second copper plating 240B. For example, one or more of the first copper plating 240A and the second copper plating 240B has a thickness of up to approximately 15 microns.

The first copper plating 240A forms a first plated perimeter that runs around the outside of the surface formed by the three sub-cores 250A, 250B, and 250C. Similarly, the second copper plating 240B forms a second plated perimeter that runs around the outside of the surface formed by the three sub-cores 250D, 250E, and 250F.

For example, one or more of the first core 230A and the second core 230B comprises a multi-component core. For example, as depicted, the first core 230A comprises a triaxial first core 230A comprising three sub-cores 250A, 250B, and 250C. For example, the three sub-cores 250A, 250B, and 250C are twisted together. For example, as depicted, the second core 230B comprises a triaxial second core 230B comprising three sub-cores 250D, 250E, and 250F. For example, the three sub-cores 250D, 250E, and 250F are twisted together.

For example, one or more of the sub-cores 250A-250F comprises yarn. For example, one or more of the sub-cores 250A-250F comprises CNT yarn.

For example, one or more of the first sub-cores 250A-250F comprises chemically stretched CNT yarn (CSY). CSY pretreatment comprises an acid wash that uses chlorosulfonic acid to provide an optimal template to maximize conductivity of the plating layer. CSY pretreatment acid dopes semi-conducting CNT, thereby increasing conductivity. CSY also densifies the yarn. CSY also improves CNT network connectivity.

The three sub-cores 250A, 250B, and 250C are twisted together to form a first twisted wire 210A of a desired gauge. For example, at least one of the three sub-cores 250A, 250B, and 250C has a desired approximate diameter. Alternatively, seven 1.5 tex sub-cores (not shown) are twisted together to form a 28 American Wire Gauge (28 AWG) first twisted wire 210A.

Figure 2B:
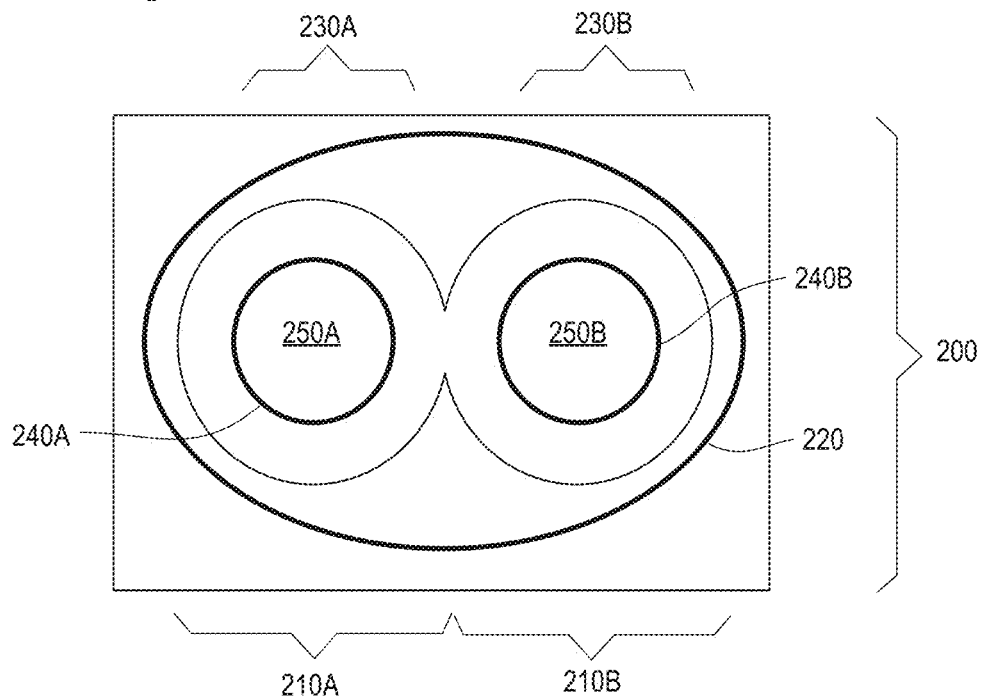

FIG. 2B shows an alternative embodiment of the CNT cable 200 in which the first twisted wire 210A comprises one sub-core 250A and the second twisted wire 210B comprises one sub-core 250B. Also shown are the shield 220, the first core 230A, the second core 230B, the first plated perimeter 240A and the second plated perimeter 240B.

FIG. 2C shows an alternative embodiment of the CNT cable 200 in which the first twisted wire 210A comprises four sub-cores 250A-250D and the second twisted wire 210B comprises four sub-cores 250E-250H. Also shown are the shield 220, the first core 230A, the second core 230B, the first plated perimeter 240A and the second plated perimeter 240B.

FIG. 2D shows an alternative embodiment of the CNT cable 200 in which the first twisted wire 210A comprises seven sub-cores 250A-250G and the second twisted wire 210B comprises four sub-cores 250H-250N. Also shown are the shield 220, the first core 230A, the second core 230B, the first plated perimeter 240A and the second plated perimeter 240B.

An optimal yarn configuration comprises 28 AWG CNT wire comprising four sub-cores. This configuration provides an excellent balance between competing considerations of maximizing plated perimeter and minimizing number of sub-cores.

Embodiments of the invention have a conductivity above approximately 10 megasiemens per meter (MS/m). Embodiments of the invention have a conductivity above approximately 20 MS/m. Embodiments of the invention have a conductivity of approximately 20 MS/m to 58.5 MS/m. Preferably, the fiber is lightweight. Preferably, the fiber has high tensile strength.

FIGS. 3A-3D are a set of four micrographs showing a prior art CNT wire, a CNT wire that is copper plated according to embodiments of the invention, a CNT wire pretreated according to embodiments of the invention by performing an acid wash using chemically stretched CNT yarn (CSY), and a CSY pretreated CNT wire after copper plating according to embodiments of the invention.

Figure 3A:
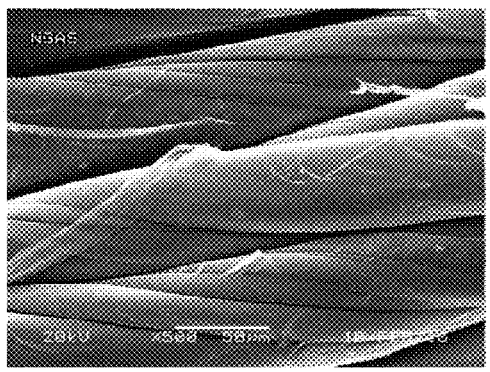
FIGS. 3A-3D are a set of four micrographs showing a prior art CNT wire, a CNT wire that is copper plated according to embodiments of the invention, a CNT wire pretreated according to embodiments of the invention by performing an acid wash using chemically stretched CNT yarn (CSY), and a CSY pretreated CNT wire after copper plating according to embodiments of the invention.

FIG. 3A is a micrograph of a prior art bare 28 American Wire Gauge (28 AWG) CNT wire with a linear density of approximately 1.5 tex (1.5 grams per kilometer).

Figure 3B:
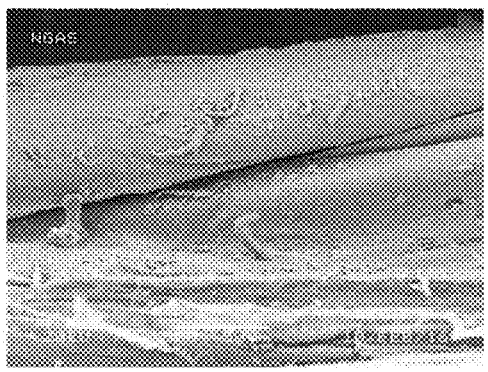

FIG. 3B is a micrograph of a 28 AWG CNT wire with a linear density of approximately 1.5 tex that is copper plated according to embodiments of the invention.

Figure 3C:
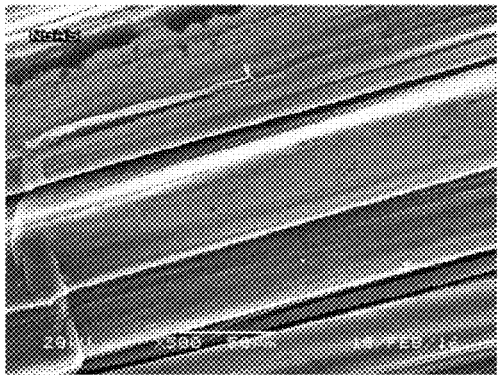

FIG. 3C is a micrograph of a bare 28 AWG CNT wire with a linear density of approximately 10 tex that is pretreated according to embodiments of the invention using CSY.

Figure 3D:
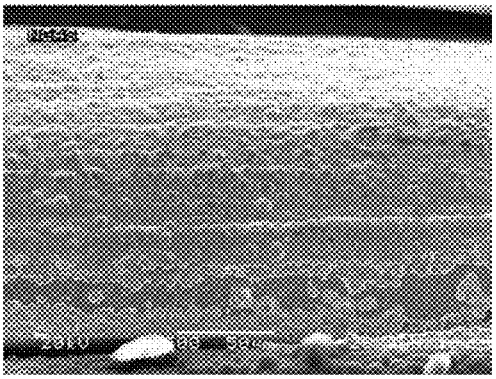

FIG. 3D is a micrograph of a 28 AWG CNT wire with a linear density of approximately 10 tex that is pretreated using CSY and is copper plated according to embodiments of the invention.

CSY pretreatment according to embodiments of the invention produces yarn with a surface comprising substantially no loose CNT fibers that act as nucleation sites for large-scale surface defects during electroplating. CSY pretreatment of yarn according to embodiments of the invention produces yarn having minimal defects and also minimal surface roughness that does not contribute to a final surface roughness of a plated surface. Surface roughness of plated layer appears to be a function of conditions of an electroplating process used in operating the invention. Pretreatment with CSY according to embodiments of the invention results in an ideal, smooth substrate for electroplating the wire. CSY pretreatment also increases conductivity of the CNT cable.

FIGS. 4A-4H are a set of eight micrographs showing both small-scale surface roughness and large-scale surface defects for both 24 American Wire Gauge (24 AWG) wire with an average grain size of approximately 1.8 microns and 28 American Wire Gauge (28 AWG) wire with an average grain size of approximately 7.2 microns. For example, the CNT cable comprises a pair of twisted wires, each wire having a grain size less than or equal to approximately 10 microns. For example, the CNT cable comprises a pair of twisted wires, each wire having a grain size less than or equal to approximately 3 microns.

Small-scale surface roughness means roughness visible using a magnification of approximately 2000 times. Large-scale surface defects means surface defects visible using a magnification of approximately 100 times.

Figure 4A:
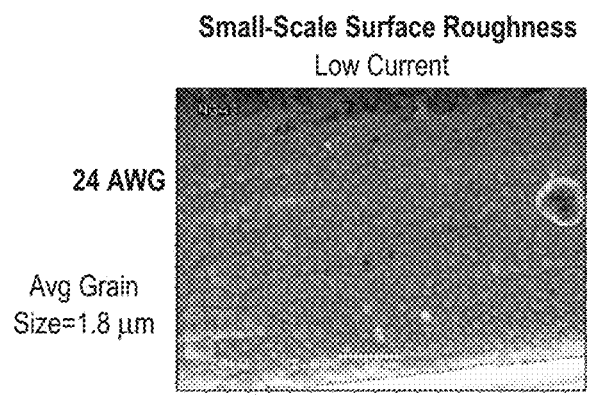
FIGS. 4A-4H are a set of eight micrographs showing both small-scale surface roughness and large-scale surface defects for both 24 American Wire Gauge (24 AWG) wire and 28 American Wire Gauge (28 AWG) wire.

FIG. 4A is a micrograph of small-scale surface roughness for embodiments of the invention using 24 AWG wire with an average grain size of 1.8 microns and a low current.

Figure 4B:
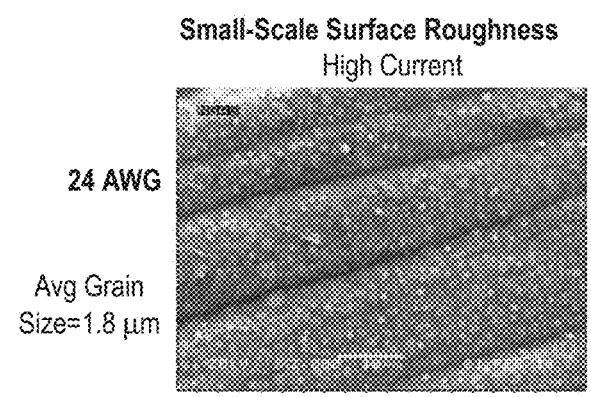

FIG. 4B is a micrograph of small-scale surface roughness for embodiments of the invention using 24 AWG wire with an average grain size of 1.8 microns and a high current.

Figure 4C:
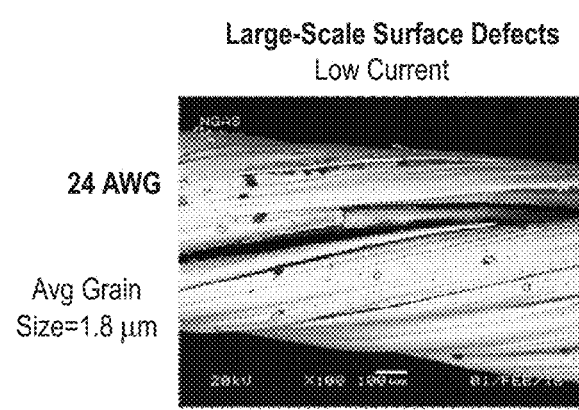

FIG. 4C is a micrograph of large-scale surface defects for embodiments of the invention using 24 AWG wire with an average grain size of 1.8 microns and a low current.

Figure 4D:
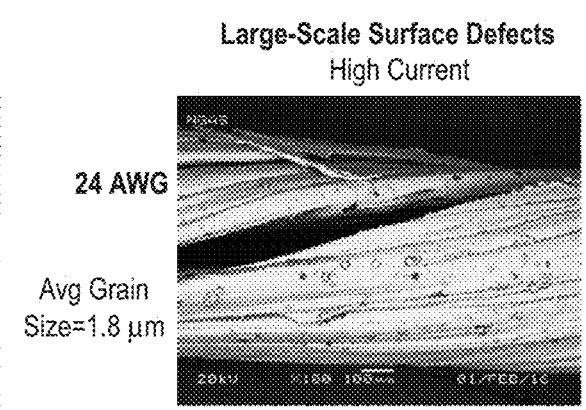

FIG. 4D is a micrograph of large-scale surface defects for embodiments of the invention using 24 AWG wire with an average grain size of 1.8 microns and a high current.

Figure 4E:
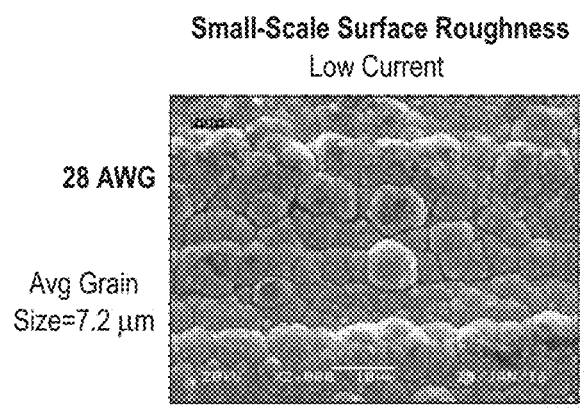

FIG. 4E is a micrograph of small-scale surface roughness for embodiments of the invention using 28 AWG wire with an average grain size of 7.2 microns and a low current.

Figure 4F:
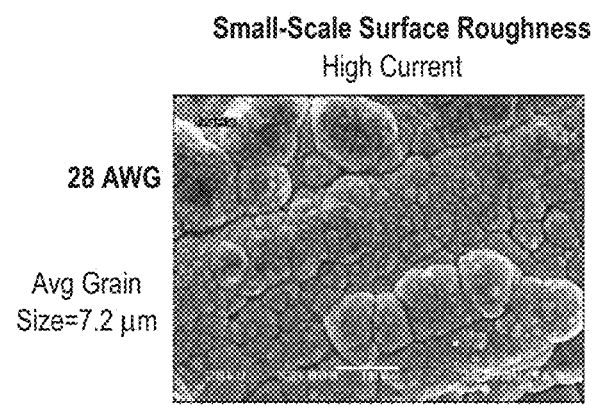

FIG. 4F is a micrograph of small-scale surface roughness for embodiments of the invention using 28 AWG wire with an average grain size of 7.2 microns and a high current.

Figure 4G:
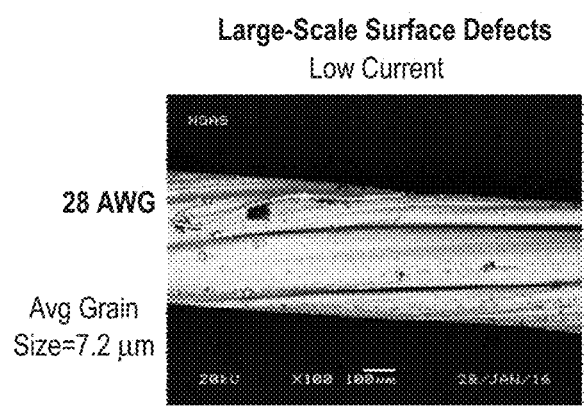

FIG. 4G is a micrograph of large-scale surface defects for embodiments of the invention using 28 AWG wire with an average grain size of 7.2 microns and a low current.

Figure 4H:
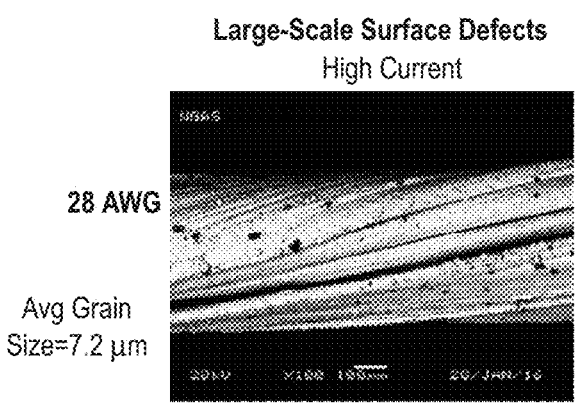

FIG. 4H is a micrograph of large-scale surface defects for embodiments of the invention using 28 AWG wire with an average grain size of 7.2 microns and a high current.

It can be seen that plated copper conductivity has a negative correlation with surface roughness. It can be seen that plated copper conductivity has a negative correlation with surface defects. Lowering copper deposition rate during electroplating according to embodiments of the invention maximizes conductivity of the plating layer. According to embodiments of the invention, the copper deposition rate is less than or equal to approximately 12 microns per minute.

According to embodiments of the invention, minimizing surface roughness can be achieved by using a lower copper deposition rate during the electroplating process.

According to embodiments of the invention, substantially eliminating surface defects can be achieved by using a lower copper deposition rate during the electroplating process.

Table 1 presents experimentally obtained data (electroplating current and conductivity [MS/m] of resulting embodiment of invention) extracted from FIG. 4 in tabular form.

TABLE 1

| Material | Current | Conductivity (Megasiemens per meter ([MS/m) |
|---|---|---|
| 24 AWG Cu Plated CNT | Low | 29.1 |
| 24 AWG Cu Plated CNT | High | 20.9 |
| 28 AWG Cu Plated CNT | High | 11.6 |
| 28 AWG Cu Plated CNT | Low | 13.9 |

Embodiments of the invention have a conductivity above approximately 10 MS/m. Embodiments of the invention have a conductivity above approximately 20 MS/m. Embodiments of the invention have a conductivity of approximately 20 MS/m to 58.5 MS/m. Preferably, the fiber is lightweight. Preferably, the fiber has high tensile strength.

Figure 5A:
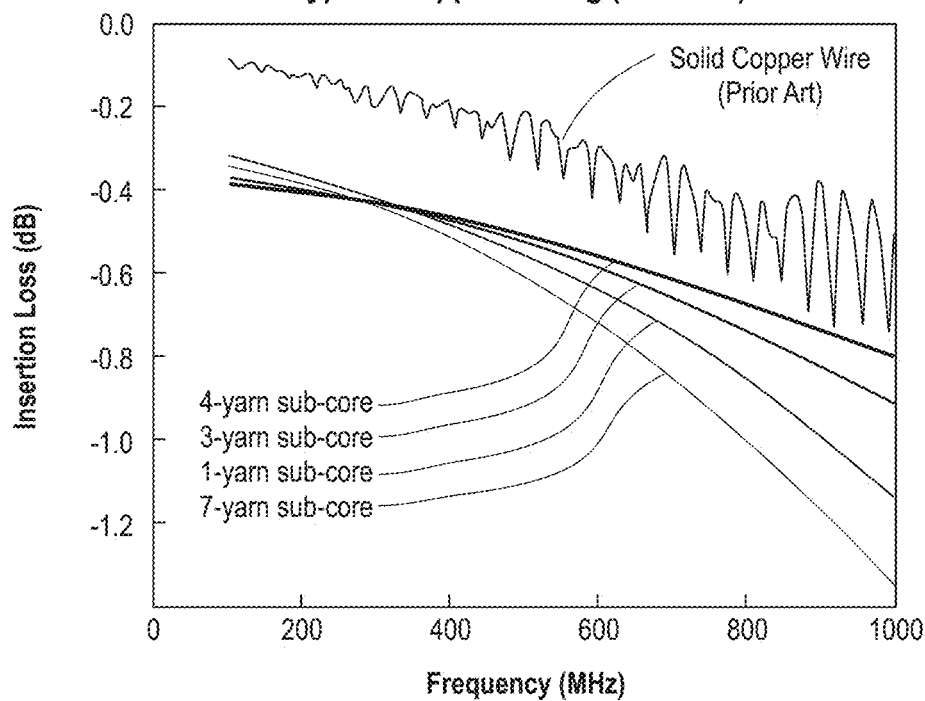
FIGS. 5A-5B are a set of two graphs showing computer simulated data regarding insertion loss (decibels [dB]) of a CNT yarn cable using a twisted wire comprising four different numbers of sub-cores.
Figure 5B:
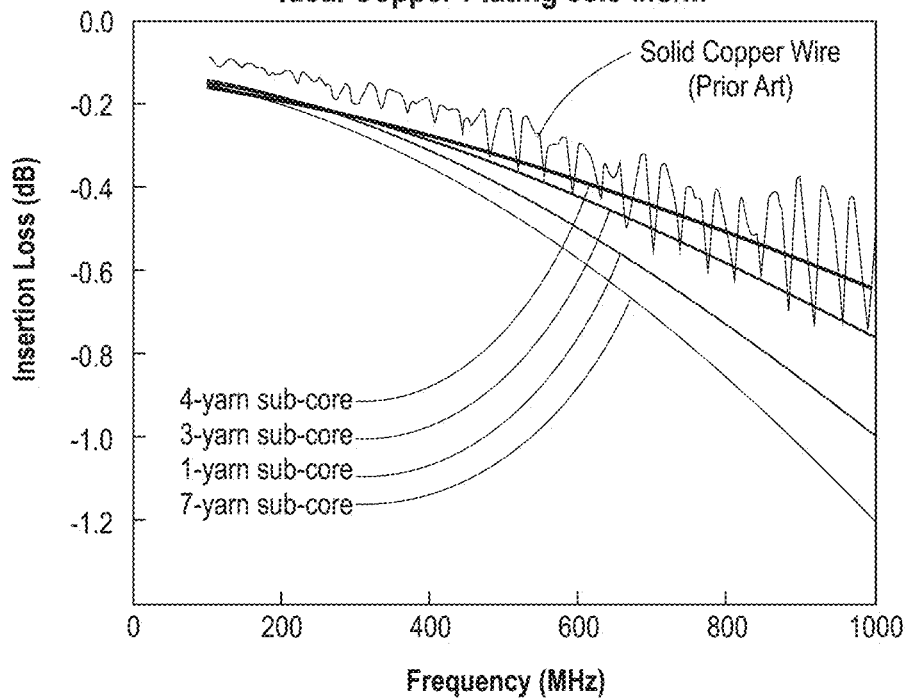

FIGS. 5A-5B are a set of two graphs showing computer simulated data regarding insertion loss (decibels [dB]) of a CNT yarn cable using a twisted wire comprising four different numbers of sub-cores. FIGS. 5A and 5B each present insertion loss for a CNT cable comprising 1, 3, 4, and 7 sub-cores in each twisted wire. relative to insertion loss for prior art unplated CNT wire for different frequencies in Megahertz (MHz). FIGS. 5A-5B also each present measured insertion loss as a function of frequency for prior art solid copper wire.

FIG. 5A presents computer simulated data regarding insertion loss for a CNT cable comprising 1, 3, 4, and 7 sub-cores and using typical copper plating having conductivity of 20 megasiemens per meter (MS/m). The CNT cable comprising 1 sub-core has a plated perimeter of approximately 1,005 microns. The CNT cable comprising 3 sub-cores has a plated perimeter of approximately 1,108 microns. The CNT cable comprising 4 sub-cores has a plated perimeter of approximately 1,268 microns. The CNT cable comprising 7 sub-cores has a plated perimeter of approximately 1,257 microns.

FIG. 5B presents computer simulated data regarding insertion loss for a CNT cable comprising 1, 3, 4, and 7 sub-cores and using typical copper plating having conductivity of 58 megasiemens per meter (MS/m), which represents the highest conductivity achievable with copper plating.

Figure 6A:
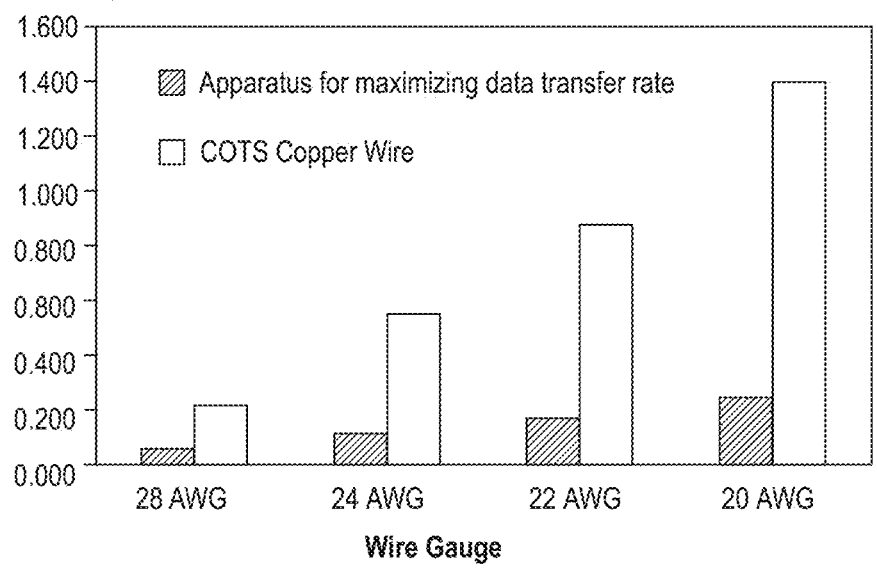
FIG. 6A is a bar graph showing wire weight for a CNT yarn cable in embodiments using 28 AWG wire, 24 AWG wire, 22 AWG wire and 20 AWG wire, and showing comparative wire weights for the same four wires for prior art commercial off the shelf (COTS) copper wire.

FIG. 6A is a bar graph showing wire weight for a CNT yarn cable in embodiments using 28 AWG wire, 24 AWG wire, 22 AWG wire and 20 AWG wire, and showing comparative wire weights for the same four wires for prior art COTS copper wire.

A typical weight for the CNT cable in an embodiment using 28 AWG wire is approximately 0.06 grams per foot (g/ft). A typical weight for the CNT cable in an embodiment using 24 AWG wire is approximately 0.12 g/ft. A typical weight for the CNT cable in an embodiment using 20 AWG wire is approximately 0.25 g/ft.

Figure 6B:
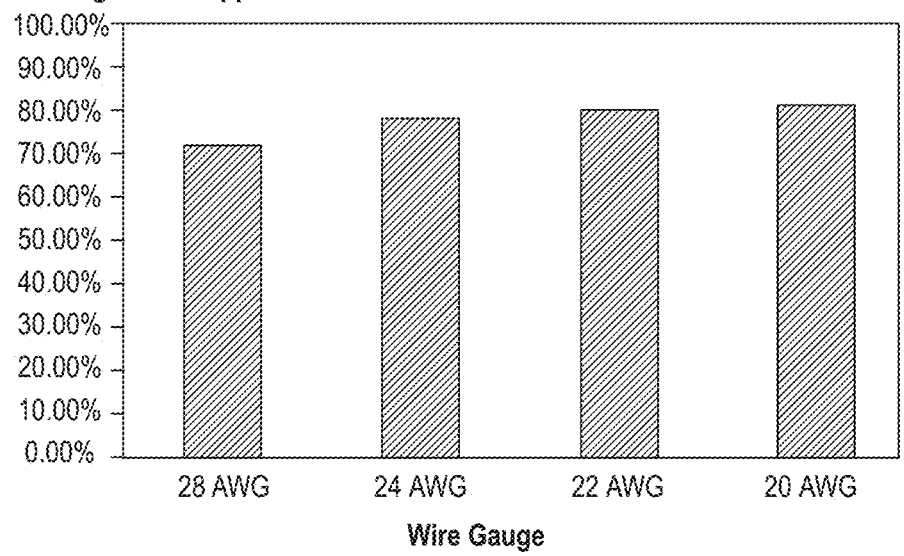
FIG. 6B is a bar graph showing a reduction in weight of a CNT yarn cable relative to prior art COTS wire.

FIG. 6B is a bar graph showing a reduction in weight of a CNT yarn cable relative to prior art COTS wire for the embodiments using 28 AWG wire, 24 AWG wire, 22 AWG wire and 20 AWG wire. The reduction in weight for a CNT yarn cable relative to copper off the shelf wire of between approximately 60% and approximately 90%.

Figure 7:
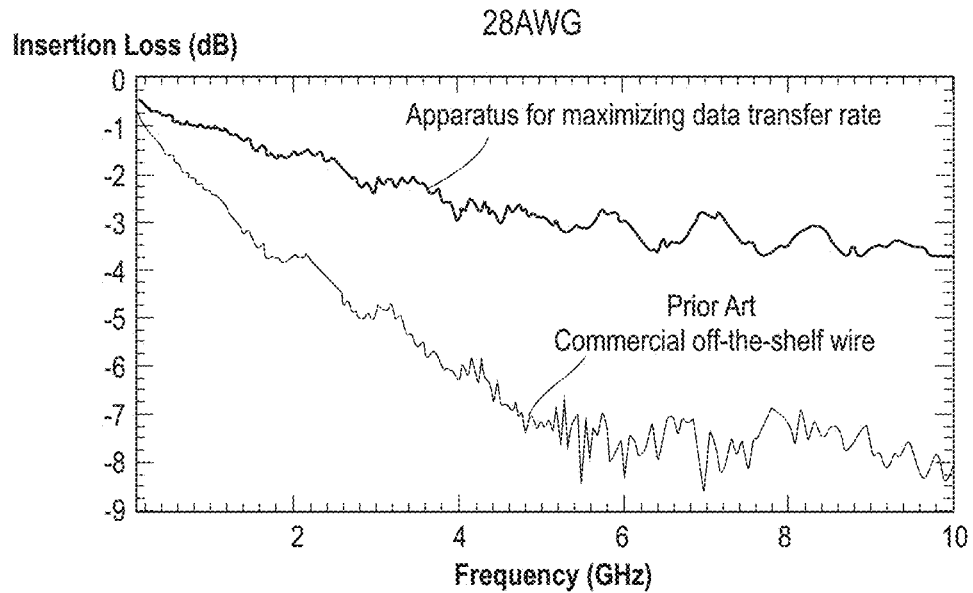
FIG. 7 is a graph showing insertion loss of a CNT yarn cable relative to insertion loss for prior art unplated commercial CNT wire for different frequencies.

FIG. 7 is a graph showing insertion loss (decibels [dB]) of a CNT yarn cable relative to insertion loss for prior art unplated commercial CNT wire for different frequencies in Gigahertz (GHz). The insertion loss for the prior art unplated commercial CNT wire increases significantly for frequencies above approximately 2-4 gigahertz (GHz) whereas the insertion loss for the CNT cable remains relatively steady.

Table 2 presents experimentally obtained data (insertion loss [decibels per foot [dB/ft]) of a CNT yarn cable relative to insertion loss (dB/ft) for prior art unplated CNT wire for different frequencies in Gigahertz [GHz]) extracted from FIG. 7 in tabular form.

TABLE 2

| Frequency (GHz) | Copper Plated CNT Wire Insertion Loss (dB/foot) | Unplated CNT Wire Insertion Loss (dB/foot) |
|---|---|---|
| 1 | −1.0 | −2.4 |
| 2 | −1.6 | −3.7 |
| 4 | −3.0 | −6.2 |
| 6 | −3.0 | −7.9 |
| 8 | −3.5 | −7.2 |
| 10 | −3.7 | −8.0 |

Figure 8:
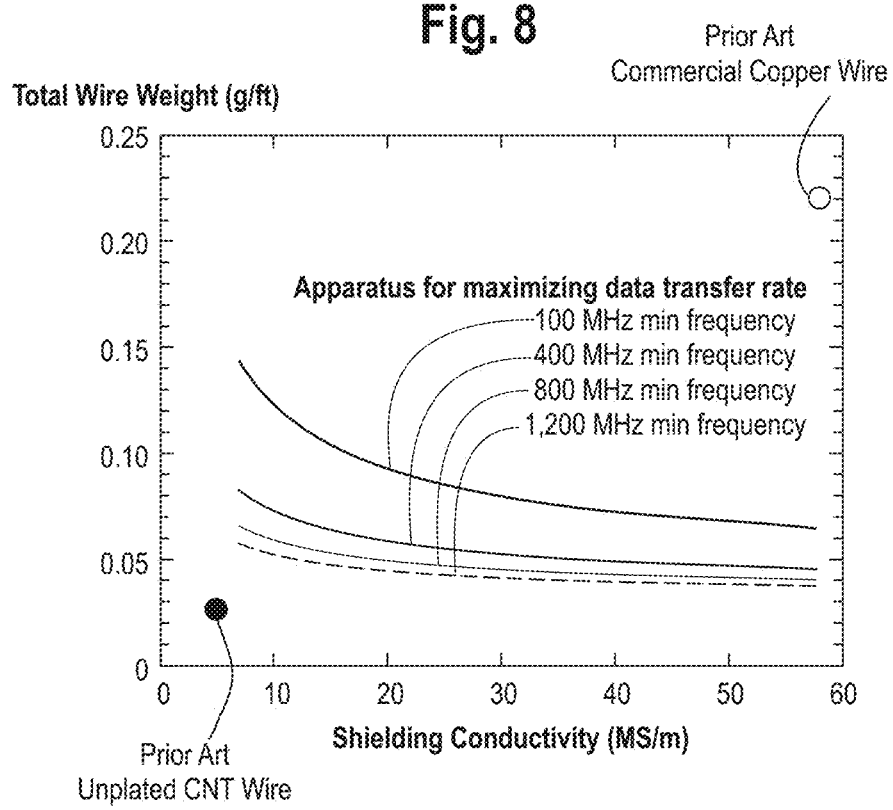
FIG. 8 is a graph of plated wire weight as a function of shielding conductivity for a CNT yarn cable using 28 AWG plated wire at four different approximate minimum operating frequencies.

FIG. 8 is a graph of total wire weight (grams per foot [g/ft]) as a function of shielding conductivity (megasiemens per meter [MS/m]) for a CNT yarn cable using 28 AWG plated wire at four different approximate minimum operating frequencies. The approximate minimum operating frequencies presented are 100 Megahertz (MHz), 400 MHz, 800 MHz, and 1,200 MHz. FIG. 8 also shows the corresponding data points for prior art unplated CNT wire and for prior art commercial copper wire.

Embodiments of the invention improve upon conductivity of prior art unplated CNT wire while maintaining weight savings relative to prior art copper wire. FIG. 8 also presents measured shielding weight as a function of measured shielding conductivity for prior art copper wire and for prior art unplated CNT wire.

A weight of an embodiment of the invention is approximately inversely proportional to signal frequency. Less plating is required for signal wires operating at higher frequencies according to embodiments of the invention.

Embodiments of the invention provide skin depth confinement of RF signals.

Enhancements according to embodiments of the invention of the electroplating process, include one or more of controlling the deposition rate and pretreatment. The enhancements achieve one or more of increasing wire conductivity and lowering total cable weight. According to embodiments of the invention, the copper deposition rate is less than or equal to approximately 12 microns per minute.

FIG. 9 is a flowchart of a method 900 for making a CNT yarn cable. The order of the steps in the method 900 is not constrained to that shown in FIG. 9 or described in the following discussion. Several of the steps could occur in a different order without affecting the final result.

In step 910, controlling a deposition rate, plating is deposited so as to surround each of a pair of wires, each wire comprising one or more sub-cores, at least one sub-core comprising CNT yarn. Block 910 then transfers control to block 920.

In step 920, the plated wires are twisted together. For example, the twisting step comprises twisting together a plurality of sub-cores, thereby creating the pair of twisted wires, each comprising the plurality of sub-cores. For example, the twisting step comprises controlling a number of sub-cores. For example, the twisting step comprises controlling an approximate diameter of at least one of the plurality of sub-cores. Block 920 then transfers control to block 930.

In step 930, the plated twisted wires are surrounded with an electrical layer configured to shield the plated twisted wires, thereby creating the CNT cable. Block 930 then terminates the process.

Optionally, the method includes an additional step, performed after the depositing step and prior to the surrounding step, of placing a dielectric around the plated twisted wires.

Optionally, the method includes an additional step, performed before the creating step, of chemically pretreating the CNT yarn cable.

For example, the pretreating step comprises chemically pretreating the CNT yarn cable by performing an acid wash using chlorosulfonic acid.

For example, depositing comprises depositing plating at a rate less than or equal to approximately 12 microns per minute.

For example, the pretreating step comprises treatment of the CNT yarn cable with a solvent.

For example, the solvent comprises one or more of acetone, isopropyl alcohol (IPA), and methanol.

FIG. 10 is a flowchart of a method 1000 for making a CNT yarn cable. The order of the steps in the method 1000 is not constrained to that shown in FIG. 10 or described in the following discussion. Several of the steps could occur in a different order without affecting the final result.

In step 1010, using chlorosulfonic acid, at least one of a plurality of sub-cores comprising CNT yarn is chemically pretreated. Block 1010 then transfers control to block 1020.

In step 1020, controlling a deposition rate, plating is deposited so as to surround each of a pair of wires, each wire comprising a sub-core. Block 1020 then transfers control to block 1030.

In step 1030, a dielectric is placed around the plated twisted wires. Block 1030 then transfers control to block 1040.

In step 1040, controlling a number of sub-cores, and controlling an approximate diameter of at least one of the plurality of sub-cores, the plated wires are twisted together. Block 1040 then transfers control to block 1050.

In step 1050, the dielectric is surrounded with an electrical layer configured to shield the plated twisted wires, thereby creating the CNT cable. Block 1050 then terminates the process.

Embodiments of the invention provide numerous benefits. Enhancements according to embodiments of the invention of the electroplating process, including one or more of controlling the deposition rate and pretreatment, achieves one or more of increasing wire conductivity and lowering total cable weight.

Pretreatment with CSY according to embodiments of the invention results in an ideal, smooth substrate for electroplating the wire.

A weight of an embodiment of the invention is approximately inversely proportional to signal frequency. Less plating is required for signal wires operating at higher frequencies according to embodiments of the invention.

Embodiments of the invention provide skin depth confinement of RF signals.

Relative to metallic wires, embodiments of the invention are more resilient to flexural, tension and other induced mechanical strain during installation, integration, testing, and operation.

Plating thickness is optimized to match a natural skin depth of high-frequency signals, ensuring that signal quality is not substantially affected by use of a strong, lightweight CNT core instead of a prior art copper wire.

Embodiments of the invention provide data transfer rates in a single twisted wire pair of at least approximately 1.25 Gigabits per second (Gbit/s), which is more than 40 times the maximum data rate of prior art cables lacking electroplated copper, which are limited to a maximum data rate of approximately 30 Mbit/s. The data transfer rate of at least approximately 1.25 Gbit/s is also more than three times the data transfer speed of Universal Serial Bus (USB) 2.0.

Embodiments of the invention comprise a fibrous CNT core configured to bend more easily than the prior art metallic wire. Moreover, embodiments of the invention comprise a fibrous CNT core having a smaller bending radius than the prior art metallic wire. Additionally, embodiments of the invention are more flexible than prior art alternatives, allowing them to be stored in smaller spaces.

Embodiments of the invention can more effectively transmit power than prior art metal-coated polymer wires. Embodiments of the invention have superior conductivity relative to prior art unplated CNT cables even above frequencies greater than approximately 30 Megahertz (MHz). Embodiments of the invention also have superior RF insertion loss relative to prior art unplated CNT cables even above frequencies greater than approximately 30 MHz.

Embodiments of the invention using copper-plated CNT yarn provide larger weight savings for comparable electrical performance relative to embodiments of the invention using CNT yarn plated with one or more of silver, gold, and copper. Relative to prior art copper conductors, embodiments of the invention are very lightweight, reducing component weight by approximately 72-82% and overall cable weight by approximately 35-50%.

The embodiments of the invention using copper-plated yarn are also significantly more cost-effective due to the higher cost of silver and gold.

Embodiments of the invention using one or more of a quad-axial yarn and a triax yarn provide a total cable surface area that is larger than that of a standard off-the-shelf cable. By limiting the total number of yarns to one or more of three and four, parasitic induction is minimized, allowing for total RF insertion loss of the cable to be minimized. In a departure from conventional stranded cables, pursuant to embodiments of the invention, one or more of triax yarns and quad-axial yarns are only plated on their external surface, thereby providing enhanced scalability of plated wire architecture to larger wire diameters without significantly reducing weight savings. Also, according to embodiments of the invention, CSY pretreatment provides an optimal template to maximize conductivity of the plating layer. According to embodiments of the invention, CSY pretreatment optimally conditions the geometry of the CNT surface for plating, which results in maximized conductivity of the plating layer.

Embodiments of the invention provide a high strength cable having a strength of approximately 4.6 to 5 Megapascals-cubic meter per kilogram or 4.6-5 MPa-m$^3$/kg.

It will be further understood by those of skill in the art that the number of variations of the invention and the like are virtually limitless. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention. For example, the two twisted wires could have different numbers of sub-cores in them.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

We claim:

1. A method for making a carbon nanotube (CNT) cable, comprising:
    chemically pretreating CNT yarn using chlorosulfonic acid;
    lowering a copper deposition rate so as to be less than or equal to 12 microns per minute, electroplating so as to surround each of a pair of 24 American Wire Gauge (24AWG) wires with plating, each wire comprising two or more sub-cores, at least one sub-core comprising the CNT yarn, wherein the CNT yarn comprises chemically stretched CNT yarn, wherein the CNT yarn comprises one or more of a quad-axial yarn and a triax yarn, thereby creating plated wires, wherein the plating comprises copper, wherein the plating has a thickness less than or equal to 15 microns;
    twisting the copper-plated wires together, wherein the twisting step comprises twisting together the two or more sub-cores, thereby creating a pair of-twisted wires, each comprising the two or more sub-cores, wherein the twisting step further comprises controlling a number of sub-cores; and
    surrounding the plated twisted wires with an electrical layer configured to shield the plated twisted wires, thereby creating the CNT cable, the CNT cable having a radio frequency (RF) insertion loss less than or equal to 4.0 decibels per foot at a frequency of 4 Gigahertz, the CNT cable having a grain size less than 10 microns, the CNT cable having a data transfer rate of at least 1.25 Gigabits per second (Gbit/s), the CNT cable having a data transfer rate more than 40 times a maximum data rate of prior art cables lacking electroplated copper, the CNT cable having a data transfer rate more than three times a data transfer speed of Universal Serial Bus (USB) 2.0, the CNT cable having a weight of approximately 0.12 grams per foot, and the CNT cable having conductivity between 10 megasiemens per meter to 58.5 megasiemens per meter.

2. The method of claim 1, further comprising a step, performed after the electroplating step and prior to the surrounding step, of placing a dielectric around the copper-plated twisted wires.

3. The method of claim 2, further comprising a step, performed after the step of surrounding with the electrical layer, of surrounding the electrical layer with a physical layer.

4. The method of claim 3, wherein the physical layer comprises a braid.

5. The method of claim 4, wherein the braid is configured to protect the electrical layer from abrasion.

6. The method of claim 1, wherein the twisting step further comprises controlling an approximate diameter of at least one of the two or more sub-cores.

7. The method of claim 1, in which the CNT cable has a radio frequency (RF) insertion loss less than or equal to 2.0 decibels per foot at a frequency of 1 Gigahertz.

* * * * *